US010628389B2

(12) United States Patent
Bordens

(10) Patent No.: US 10,628,389 B2
(45) Date of Patent: Apr. 21, 2020

(54) VERIFICATION OF DATA PROVENANCE FOR EXISTING COMPUTER SYSTEMS

(71) Applicant: Merck Sharp & Dohme Corp., Rahway, NJ (US)

(72) Inventor: Jacob Ryan Bordens, Chatham, NJ (US)

(73) Assignee: Merck Sharp & Dohme Corp., Rahway, NJ (US)

( * ) Notice: Subject to any disclaimer, the term of this patent is extended or adjusted under 35 U.S.C. 154(b) by 81 days.

(21) Appl. No.: 15/880,256

(22) Filed: Jan. 25, 2018

(65) Prior Publication Data

US 2019/0228086 A1    Jul. 25, 2019

(51) Int. Cl.

| | | |
|---|---|---|
| *G06F 16/182* | (2019.01) | |
| *G06F 16/23* | (2019.01) | |
| *H04L 9/32* | (2006.01) | |
| *H04L 9/06* | (2006.01) | |
| *G06F 21/62* | (2013.01) | |
| *G06F 3/06* | (2006.01) | |
| *G06F 21/64* | (2013.01) | |
| *H04L 29/06* | (2006.01) | |
| *H04L 29/08* | (2006.01) | |

(52) U.S. Cl.
CPC .......... *G06F 16/182* (2019.01); *G06F 3/0626* (2013.01); *G06F 16/2365* (2019.01); *G06F 21/62* (2013.01); *G06F 21/64* (2013.01); *H04L 9/0637* (2013.01); *H04L 9/3236* (2013.01); *H04L 63/00* (2013.01); *H04L 67/104* (2013.01); *H04L 2209/38* (2013.01)

(58) Field of Classification Search
CPC ......... G06F 17/30194; G06F 17/30371; G06F 16/2365
USPC .......................................................... 707/687
See application file for complete search history.

(56) References Cited

U.S. PATENT DOCUMENTS

| 9,436,923 | B1* | 9/2016 | Sriram | .................. H04L 63/126 |
| 10,157,295 | B2* | 12/2018 | Barinov | ................... H04L 63/12 |
| 2003/0050891 | A1* | 3/2003 | Cohen | ..................... G06Q 10/10 |
| | | | | 705/42 |
| 2007/0088957 | A1* | 4/2007 | Carson | .................... H04L 63/12 |
| | | | | 713/176 |
| 2008/0195579 | A1* | 8/2008 | Kennis | .................... G06Q 10/06 |
| 2009/0094250 | A1* | 4/2009 | Dhuse | ................. G06F 11/1004 |
| 2010/0161916 | A1* | 6/2010 | Thornton | ............ G06F 11/1076 |
| | | | | 711/154 |
| 2013/0332423 | A1* | 12/2013 | Puri | ...................... G06F 16/219 |
| | | | | 707/687 |

(Continued)

*Primary Examiner* — Pierre M Vital
*Assistant Examiner* — Nargis Sultana
(74) *Attorney, Agent, or Firm* — Fenwick & West LLP

(57) ABSTRACT

A proof of provenance system receives database logs from an existing system that does not natively provide data provenance verification. The system produces a local representation of the database (or a portion thereof). The system periodically or in response to another triggering event flattens the local representation of the database to generate an aggregated slice, which is stored in an aggregated slice store. A reduced representation of the aggregated slice (e.g., a hash or checksum) is determined and appended to a distributed ledger, such as a blockchain. The provenance of data from the existing system can then be verified by redetermining the reduced representation and comparing it to the version appended to the distributed ledger.

19 Claims, 4 Drawing Sheets

(56) References Cited

U.S. PATENT DOCUMENTS

| | | | | |
|---|---|---|---|---|
| 2016/0292680 | A1* | 10/2016 | Wilson, Jr. | G06Q 20/3674 |
| 2016/0335533 | A1* | 11/2016 | Davis | G06Q 40/08 |
| 2016/0342656 | A1* | 11/2016 | Dubost | G06F 16/2358 |
| 2017/0005804 | A1* | 1/2017 | Zinder | H04L 9/3247 |
| 2017/0075938 | A1* | 3/2017 | Black | G06F 21/602 |
| 2017/0126702 | A1* | 5/2017 | Krishnamurthy | H04L 63/123 |
| 2017/0206523 | A1* | 7/2017 | Goeringer | G06F 21/45 |
| 2017/0232300 | A1* | 8/2017 | Tran | H04L 67/12 434/247 |
| 2017/0250972 | A1* | 8/2017 | Ronda | H04L 9/08 |
| 2017/0262862 | A1* | 9/2017 | Aljawhari | G06F 16/242 |
| 2017/0300905 | A1* | 10/2017 | Withrow | G06Q 20/401 |
| 2017/0331624 | A1* | 11/2017 | Samid | H04L 9/0618 |
| 2017/0346693 | A1* | 11/2017 | Dix | H04L 9/3247 |
| 2017/0364552 | A1* | 12/2017 | Pattanaik | G06F 16/2365 |
| 2017/0364700 | A1* | 12/2017 | Goldfarb | G06F 21/64 |
| 2017/0364701 | A1* | 12/2017 | Struttmann | G06F 21/78 |
| 2017/0366353 | A1* | 12/2017 | Struttmann | G06F 21/64 |
| 2018/0005186 | A1* | 1/2018 | Hunn | G06Q 30/0283 |
| 2018/0012311 | A1* | 1/2018 | Small | B33Y 50/02 |
| 2018/0018723 | A1* | 1/2018 | Nagla | G06Q 20/4014 |
| 2018/0069899 | A1* | 3/2018 | Lang | G06F 8/38 |
| 2018/0096175 | A1* | 4/2018 | Schmeling | B29C 64/10 |
| 2018/0114218 | A1* | 4/2018 | Konik | G06Q 20/382 |
| 2018/0121673 | A1* | 5/2018 | Goldfarb | G06F 21/6218 |
| 2018/0158034 | A1* | 6/2018 | Hunt | G06Q 20/00 |
| 2018/0181909 | A1* | 6/2018 | Wilkinson | H04N 5/247 |
| 2018/0219669 | A1* | 8/2018 | Chen | H04L 9/002 |
| 2018/0225611 | A1* | 8/2018 | Daniel | G06Q 20/065 |
| 2018/0260212 | A1* | 9/2018 | Wisnovsky | G06F 8/71 |
| 2018/0285839 | A1* | 10/2018 | Yang | G06Q 20/0655 |
| 2018/0308072 | A1* | 10/2018 | Smith | G06Q 20/0655 |
| 2019/0147106 | A1* | 5/2019 | Androulaki | G06F 16/951 707/722 |

\* cited by examiner

VERIFICATION OF DATA PROVENANCE FOR EXISTING COMPUTER SYSTEMS

TECHNICAL FIELD

The disclosure generally relates to the field of data provenance verification, and in particular to providing such verification for existing systems that do not natively provide it with little or no modification to the existing system.

BACKGROUND

In many contexts, the ability to verify the existence and history of data is valuable. For example, in the medical and financial fields, regulators require that certain records are kept and proving that digital records existed on a certain date and have not been altered may be important for companies and individuals to demonstrate compliance. As another example, in some research contexts, it may be important for scientists to be able to demonstrate the date on which certain discoveries were made with verifiable data.

Data provenance verification can be provided by using historical record tacking and/or audit to verify the date on which specific data were created. However, many existing computer systems do not provide such functionality. While these existing systems may be modified to add this functionality, doing so is invasive. The required modifications are likely to require system downtime, testing, and/or validation, which may not be viable for business, technological, regulatory, or other reasons. Thus, businesses and other entities are faced with situations where data provenance verification is desirable (or even required) but cannot be provided by the available technology.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

Figure 1:
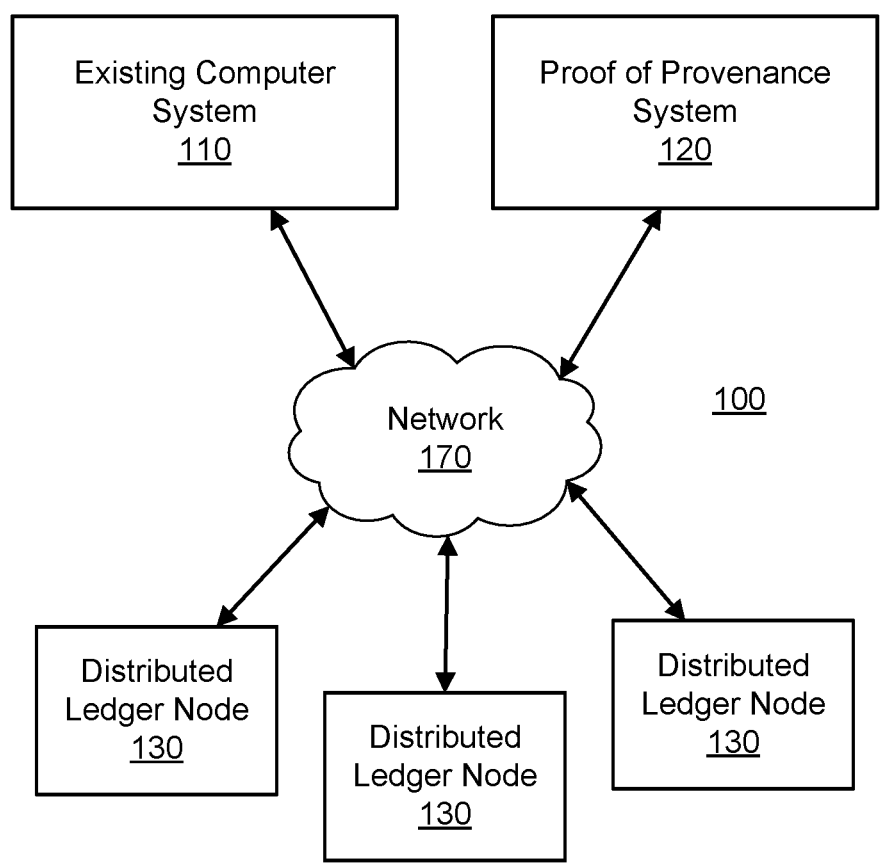
FIG. 1 illustrates a networked computing environment suitable for providing data provenance verification without substantially modifying existing systems, according to one embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Distributed ledgers were developed as a means for parties to engage in transactions, e.g., financial transactions, without the need for a single, trusted intermediary. In such systems, each transaction is recorded independently by several nodes (e.g., on a blockchain). No one entity controls all of the nodes so it is impossible (or at least exceedingly difficult) for a malicious actor to alter the transaction once it has been recorded by the nodes. Accordingly, the transactions can be conducted without the parties needing to trust each other, or any individual node provider.

The use of distributed ledgers to provide cryptographically verifiable records is not limited to financial transactions. Once a data item has been added to a distributed ledger, it becomes extremely difficult to alter as they are essentially immutable and subject to inquiry and additional analysis when they fork. That data item, as well as the time it was added to the ledger, can be viewed by anyone with access to the ledger. In typical cases, the nodes of a distributed ledger can be accessed publicly via the internet, thus making the data item and its history available to anyone with an internet-enabled computer and appropriate software.

Disclosed by way of example embodiment is a configuration that may include a method (and/or corresponding system and computer-readable medium storing instructions executable by one or more processors) for providing data provenance verification to existing systems without substantially altering those systems. An example configuration may include receiving database logs generated by the existing system that indicates operations performed on data stored by the existing system. A local representation of at least a portion of the data is updated based on the database logs. Information is extracted from the local representation and aggregated into an aggregated slice, which is stored in an aggregated slice store. A function may be applied to the aggregated slice to generate a reduced representation of the aggregated slice, such as a hash or checksum, and the reduced representation appended to a distributed ledger. The provenance of data included in the aggregated slice can later be verified by comparing the aggregated slice stored in the aggregated slice store to the reduced representation appended to the distributed ledger.

Example Data Provenance Verification System

FIG. 1 illustrates one embodiment of a networked computing environment 100 in which data provenance verification is provided. The networked computing environment 100 includes an existing computer system 110, a proof of provenance system 120, and several distributed ledger nodes 130, all connected via a network 170. Although only three distributed ledger nodes 130 are shown, in practice, many (e.g., hundreds, thousands, or even millions of) nodes may be connected to the network 170 at any given time. In other embodiments, the networked computing environment 100 includes different and/or additional elements. In addition, the functions may be distributed among the elements in a different manner than described.

The existing computer system 110 is one or more computing devices that generate or store data for which data provenance verification is desirable. For example, the computing devices may be desktop computers, laptop computers, servers, mainframes, tablets, smartphones, or the like. In one embodiment, the existing computer system 110 may be a laboratory computer that stores data regarding pharmacology tests that will be submitted to a regulator but does not provide a native mechanism via which the provenance of the data it stores can be verified to the regulator. The data is stored in a database (or other data store) and the existing computer system 110 generates logs indicating operations performed on the data (e.g., add, delete, modify, read, etc.). However, in conventional configurations, these logs may be modified by a bad actor, making data provenance verification practically impossible using the native features of the existing computer system alone. Embodiments of the existing computer system 110 are described in greater detail below, with reference to FIG. 2.

The proof of provenance system 120 receives the logs generated by the existing computer system 110 and processes them to generate a representation of the data. In one embodiment, the proof of provenance system 120 generates a verification value (e.g., a hash) from the representation of the data that is sent to the distributed ledger nodes 130 to be appended to the distributed ledger. The hash may also be stored locally along with metadata regarding the transaction or transactions indicated by the logs (e.g., a transaction ID, the number of the block in which the change was made, etc.). Storing the hash locally can be used to increase lookup speed and/or cross reference the distributed ledger.

At a later time, when data provenance verification is required, the proof of provenance system 120 retrieves the verification value from the distributed ledger and compares it to a second verification value generated from the locally stored data for which data provenance verification is required. If the data has been tampered with or otherwise altered, the verification values will not match. Conversely, if the verification values match, this verifies that the data has not been altered. Embodiments of the proof of provenance system 120 are described in greater detail below, with reference to FIG. 3.

The distributed ledger nodes 130 receive the verification value from the proof of provenance system 120 and append it to the distributed ledger. In one embodiment, the distributed ledger may be a blockchain and each distributed ledger node 130 maintains an independent copy of the blockchain. On receiving a verification value, a distributed ledger node 130 appends it to the end of the blockchain along with a timestamp. Thus, when the proof of provenance system 120 is used to verify the provenance of particular data, the distributed ledger node 130 can quickly identify the corresponding verification value based on the timestamp. In other embodiments, other forms of distributed ledger or distributed database that are outside the control of a single entity and are thus hard to alter once data has been added are used to store the verification values. For convenience, the term distributed ledger is used herein to describe all such storage mechanisms.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Figure 2:
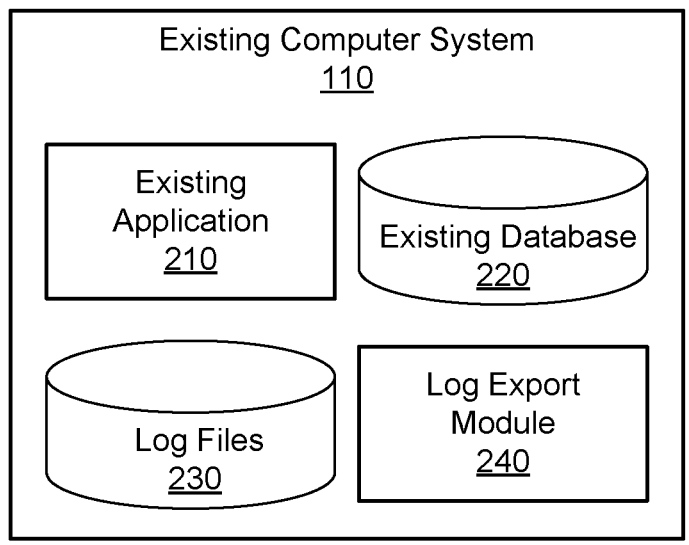
FIG. 2 illustrates an existing computer system for which data provenance verification may be provided, according to one embodiment.

Referring now to FIG. 2, it shows one embodiment of an existing computer system 110 for which data provenance verification may be provided. In the embodiment shown in FIG. 2, the existing computer system 110 includes an existing application 210, an existing database 220, log files 230, and a log export module 240. In other embodiments, the existing computer system 110 includes different and/or additional elements. In addition, the functions may be distributed among the elements in a different manner than described.

The existing application 210 is software on the existing computer system 110 that generates or maintains data for which provenance verification is desirable. However, the existing application may not natively include functionality that can verify the provenance of the data with a desired degree of certainty.

In one embodiment, the existing application 210 stores the data in an existing database 220. The existing database 220 is stored on one or more computer readable media that are configured to store the data in a searchable indexed structure. Although the existing database 220 is shown as a single entity that is part of a single computer system 110, it may also be a distributed database that the existing application 210 interacts with via the network 170. In other embodiments, the existing application 210 stores the data in other kinds of data store.

In one embodiment, the log files 230 are records indicating changes that have been made to the data stored in the existing database 220. The log files 230 are stored on one or more computer readable media and can include transaction logs, commit logs, audit trails, rollback logs, redo logs, or the like. In an alternative embodiment, the existing computer system 110 does not include an existing database 220. In this case, an existing application 210 provides a stream of output data that is added to one or more log files 230. In other words, the log files 230 themselves serve as a data repository.

The log export module 240 exports the log files 230 so that they are available to other applications and systems (e.g., the proof of provenance system 120). In one embodiment, the log export module 240 is an existing log-shipping function. Thus, the existing computer system 110 need not be modified for the proof of provenance system 120 to provide data provenance verification. The log-shipping function collects log files 230 and makes a copy that is then sent to the proof of provenance system 120. The log-shipping may occur periodically (e.g., every five minutes), automatically on modification of the log files 230, or on request (e.g., in response to a request from the proof of provenance system 120). In other embodiments, the log export module 240 is software added to the existing computer system 110, such as a database plug-in or log-monitoring script. While this does involve some modification to the existing computer system 110, it is far less invasive than modifying the existing application 210 to natively provide data provenance verification.

Example Provenance System

Figure 3:
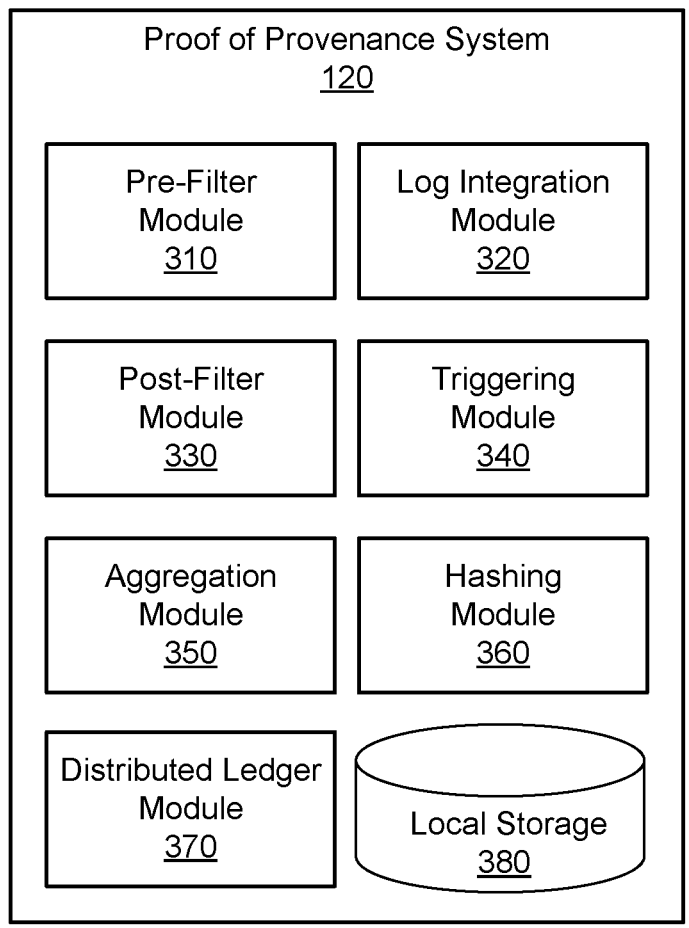
FIG. 3 illustrates a proof of provenance system that provides data provenance verification without substantially modifying existing systems, according to one embodiment.

FIG. 3 shows one embodiment of a proof of provenance system 120 that provides data provenance verification for an existing system (e.g., existing computer system 110) without requiring substantial modifications to the existing system. In the embodiment shown in FIG. 3, the proof of provenance system 120 includes a pre-filter module 310, a log integration module 320, a post-filter module 330, a triggering module 340, an aggregation module 350, a hashing module 360, a distributed ledger module 370, and local storage 380. In other embodiments, the proof of provenance system 120 includes different and/or additional elements. In addition, the functions may be distributed among the elements in a different manner than described. For example, in one embodiment, the proof of provenance system 120 does not include a pre-filter module 310 and/or a post-filter module 330.

The pre-filter module 310 may be optional. When present, the pre-filter module 310 filters the copies of log files 230 provided by the log export module 240. In one embodiment, the pre-filter module 310 removes log entries that are not relevant to the downstream process for providing data provenance verification. For example, log entries for data for which provenance verification is not desired can be removed to reduce the processing power and storage space required by the proof of provenance system 120. In some embodiments, the pre-filter module 310 is configurable (e.g., by a system administrator) to select which log entries are filtered out and which should be passed downstream for further processing. For example, log entries that correspond to read operations might be filtered out at this stage as they have no impact on the provenance of the underlying data in the database 220.

The log integration module 320 creates a local representation of the existing database 220 based on the log files 230 provided by the log export module 240. In one embodiment, the local representation of the existing database 220 is a local copy (e.g., stored in the local storage 380) of those portions of the data for which provenance verification is desired (which may be all of the data). In many cases, the log files 230 indicate changes to the data. In such cases, the log file integration module 320 initially makes a local copy of the relevant portions of the existing database 220 as part of a setup process, but once this is complete, the local copy can be updated from the log files 230 without the proof of provenance system 120 directly accessing the existing database 220. When the log files 230 indicate a change to the data, the log integration module 320 accesses the current representation of the data (e.g., in local storage 380) and updates the portion indicated in the log files. Thus, the disruption to the existing computer system 110 (to the extent there is any) is limited to the initial copying from the existing database 220 during setup.

In other embodiments, other representations of the existing database 220 may be used. For example, if the data for which provenance verification is required are lab results, each result might be stored as a data file including the lab data and metadata indicating the time at which the result was generated and other identifying information (e.g., the name of the person who ordered the test, the type of test conducted, the specific lab equipment used, etc.). As another example, if the log export module 240 provides full representations of the data objects for which provenance verification is required (e.g., rather than just changes), the log integration module 320 might just add the received data objects to local storage 380. One of skill in the art will recognize that the data may be represented in various formats, depending on the nature of the data and the specific provenance verification requirements.

The post-filter module 330 (where present) filters the local representation of the data to remove portions for which provenance verification is not desired. Unlike the pre-filter module 310, the post-filter module 330 has the advantage of the full local representation of the data, which provides additional contextual information to identify data for which provenance verification is desired. In one example embodiment, the post-filter module 330 is configurable (e.g., by a system administrator) to select what data is passed downstream for further processing. The post-filter module 330 can be configured using business rules to select for individual tables, fields, objects, or the like. For example, the post-filter module 330 may be configured to pass along data relating to one product but filter out data relating to another. As another example, customer records might be passed along for further processing whereas information relating to failed login attempts might be filtered out. In other embodiments, different filtering rules are used. In some embodiments, filtering may be performed at different or additional points in the data flow (e.g., after aggregation and/or hashing).

The triggering module 340 starts the process of generating and logging provenance information (e.g., to be appended to a distributed ledger). In one embodiment, the triggering module 340 triggers logging events at regular time intervals (e.g., every five minutes, hourly, daily, etc.). In another embodiment, the triggering module 340 triggers a logging event each time a predetermined amount of data has passed the filters applied by the post-filter module 330 (or has been received from the log integration module 320 if a post-filtering module is not used). For example, the triggering module 340 might trigger a logging event for every five updates, every hundred updates, every megabyte of added or updated data, etc. In further embodiments, the triggering module 340 might determine when to trigger a logging event based on the type of data being added or updated. For example, data related to product safety (e.g., reports of adverse side effects to medication) might trigger a logging event immediately, whereas data about sales figures and lab results might be aggregated and logged once a day.

The aggregation module 350 receives the local representation of the data (as filtered if post-filtering is used) and aggregates it into a hashable data object (referred to as an aggregated slice). In one example embodiment, the aggregation module 340 receives the filtered version of the local representation of the data and flattens all of the data objects and/or other data elements to create an aggregated slice. For example, the data may be flattened using a standard file format such as JavaScript Object Notation (JSON) or Extensible Markup Language (XML). The aggregation module 350 stores the aggregated slice for us in future data provenance verification (e.g., in local storage 380). The aggregation module 350 may also store a hash value, checksum, or other identifying information generated from the previous aggregated slice to maintain slice order and provide proof of sequence information.

The hashing module 360 generates a hash value from the aggregated slice. In one embodiment, the hashing module 360 applies a hashing function to the aggregated slice to generate a cryptographically secure hash value. The hash value is then stored in association with the corresponding aggregated slice (e.g., in local storage 380). In another embodiment, the aggregation module 350 does not store the aggregated slice, but rather the hashing module 360 stores both the aggregated slice and the corresponding hash together.

In other example embodiments, the hashing module 360 generates other representations of the data, such as a checksums. Alternatively, the hashing module 360 may be eliminated entirely with all of the data being added to the distributed ledger. However, this requires extensive storage space in the distributed ledger (which may be expensive) and also makes the data available to anyone who can access the ledger (as opposed to hashes or checksum, which generally cannot be used to recreate the original data).

The distributed ledger module 370 appends the hash value (or other representation of the data) to a distributed ledger. In various embodiments, the distributed ledger module 370 submits the hash to be appended to a distributed ledger using an append protocol provide by the ledger (e.g., an API). If the distributed ledger charges transaction fees, the distributed ledger module 370 may set an initial offer based on an available budget, a failure frequency for previous hashes, a priority of the current hash (e.g., whether it was triggered by a specific event or is just a regular, periodic update), and/or any other factors the system owner considers important for which business rules are provided. On receiving notification that the hash has been successfully appended (assuming it was), the distributed ledger module 370 checks the timestamp of the hash in the ledger and adds the timestamp as metadata for the corresponding slice of aggregated data in local storage 380. Thus, if verification of data provenance for the slice is requested, the appropriate hash can be identified on the blockchain based on the timestamp.

In one such embodiment, all hashes are committed from one address (e.g., a single address identifying all systems for a given owner). This allows coincidental collisions with other data in the ledger to be discarded by only examining hashes submitted from that address for the purpose of data provenance verification. In another embodiment, each subsystem commits hashes from a unique address. This enables even greater filtering of coincidental collisions, because the hashes can be filtered to consider only those submitted from the address used for the system for which data provenance verification is desired. In a further embodiment, a new and random (or pseudo-random) address is used to submit each hash. This limits the options for filtering hashes to reduce the likelihood of coincidental collisions, but it provides greater anonymity by obfuscating the source of any given hash in the ledger.

Regardless of the specific process for committing the hash, if the commit request fails, the distributed ledger module 370 takes corrective action. In one embodiment, the hash may be returned to a commit queue and the distributed ledger module 370 attempts to commit it to the ledger again. If the distributed ledger charges a transaction fee, the distributed ledger module 370 may increase the offered payment for second (and later) attempts to commit a hash to increase the likelihood of success.

In another embodiment, a failed hash is added to a buffer with other pending hashes. Rather than commit every hash in the buffer individually, the hashes are combined and committed to the distributed ledger in a single transaction. Thus, what is appended to the distributed ledger is a single hash that represents the combined individual hashes. One method for combining the hashes is to concatenate the hashes into a single string and then hash that string. When multiple hashes are combined, additional metadata is added to local storage 380 indicating that the hashes were combined so that the event can be reconstructed in future (e.g., when data provenance verification is requested). For example, if the buffer contains four hashes, all four might be appended to the ledger in a single transaction with metadata indicating that all four hashes were combined and the result hashed before being appended to the distributed ledger. Consequently, if a future audit uses any of the corresponding four slices, the combination and rehashing process will be repeated (based on the stored metadata) and the resulting combined hash will be compared to what is stored in the distributed ledger. Note that this technique of adding multiple hashes in a single transaction may be applied any time there is more than one hash in the buffer, not just after an append transaction has failed.

In one embodiment, the distributed ledger module 370 provides feedback to the triggering module 340 for updating trigger parameters. For example, the distributed ledger module 370 might track the total cost associated with committing hashes to the ledger and if the average hourly or daily cost exceeds a budget threshold, the triggering module 340 might adjust the trigger to create less requests to commit hashes to the ledger (e.g., every two hours instead of hourly).

The local storage 380 includes one or more computer-readable media that store data used by the proof of provenance system 120. Although the local storage 380 is shown as a single entity, it may be two or more discrete storage devices. For example, the representations of the data used by the log integration module 320 may be stored in system memory (e.g., RAM) while the aggregated slices might be stored in an array of hard drives. As another example, recently-created and/or important aggregated slices and the associated metadata might be stored on hard-drives while older and/or less important data is archived to tapes, DVDs, CDs, or the like.

Example Machine Architecture

Figure 4:
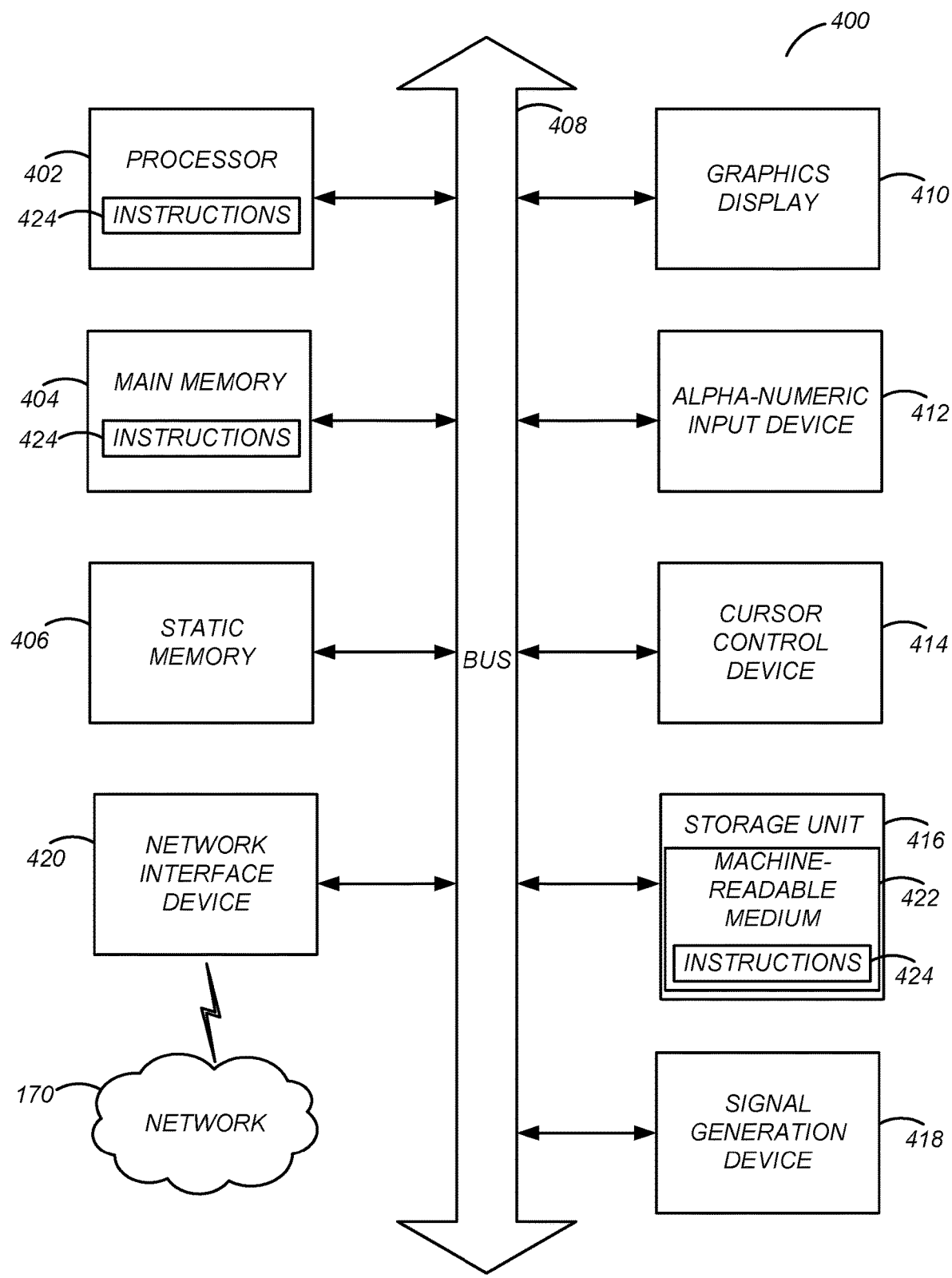
FIG. 4 illustrates components of an example machine able to read instructions from a machine-readable medium and execute them in a processor (or controller), according to one embodiment.

FIG. 4 is a block diagram illustrating components of an example machine able to read instructions from a machine-readable medium and execute them in a processor (or controller). Specifically, FIG. 4 shows a diagrammatic representation of a machine in the example form of a computer system 400. The computer system 400 can be used to execute instructions 424 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 424 (sequential or otherwise) that specify actions to be taken by that machine. Further, while only a single machine is illustrated, the term "machine" shall also be taken to include any collection of machines that individually or jointly execute instructions 424 to perform any one or more of the methodologies discussed herein.

The example computer system 400 includes one or more processing units (generally processor 402). The processor 402 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 400 also includes a main memory 404. The computer system may include a storage unit 416. The processor 402, memory 404 and the storage unit 116 communicate via a bus 108.

In addition, the computer system 406 can include a static memory 406, a display driver 410 (e.g., to drive a plasma display panel (PDP), a liquid crystal display (LCD), or a projector). The computer system 400 may also include alphanumeric input device 412 (e.g., a keyboard), a cursor control device 414 (e.g., a mouse, a trackball, a joystick, a motion sensor, or other pointing instrument), a signal generation device 418 (e.g., a speaker), and a network interface device 420, which also are configured to communicate via the bus 408.

The storage unit 416 includes a machine-readable medium 422 on which is stored instructions 424 (e.g., software) embodying any one or more of the methodologies or functions described herein. The instructions 424 may also reside, completely or at least partially, within the main memory 404 or within the processor 402 (e.g., within a processor's cache memory) during execution thereof by the computer system 400, the main memory 404 and the processor 102 also constituting machine-readable media. The instructions 424 may be transmitted or received over a network 170 via the network interface device 420.

While machine-readable medium 422 is shown in an example embodiment to be a single medium, the term "machine-readable medium" should be taken to include a single medium or multiple storage media systems (e.g., a centralized or distributed database, or associated caches and servers) able to store the instructions 424. The term "machine-readable medium" shall also be taken to include any medium that is capable of storing instructions 424 for execution by the machine and that cause the machine to perform any one or more of the methodologies disclosed herein. The term "machine-readable medium" includes, but not be limited to, data repositories in the form of solid-state memories, optical media, and magnetic media.

Example Methods for Providing Data Provenance Verification

Figure 5:
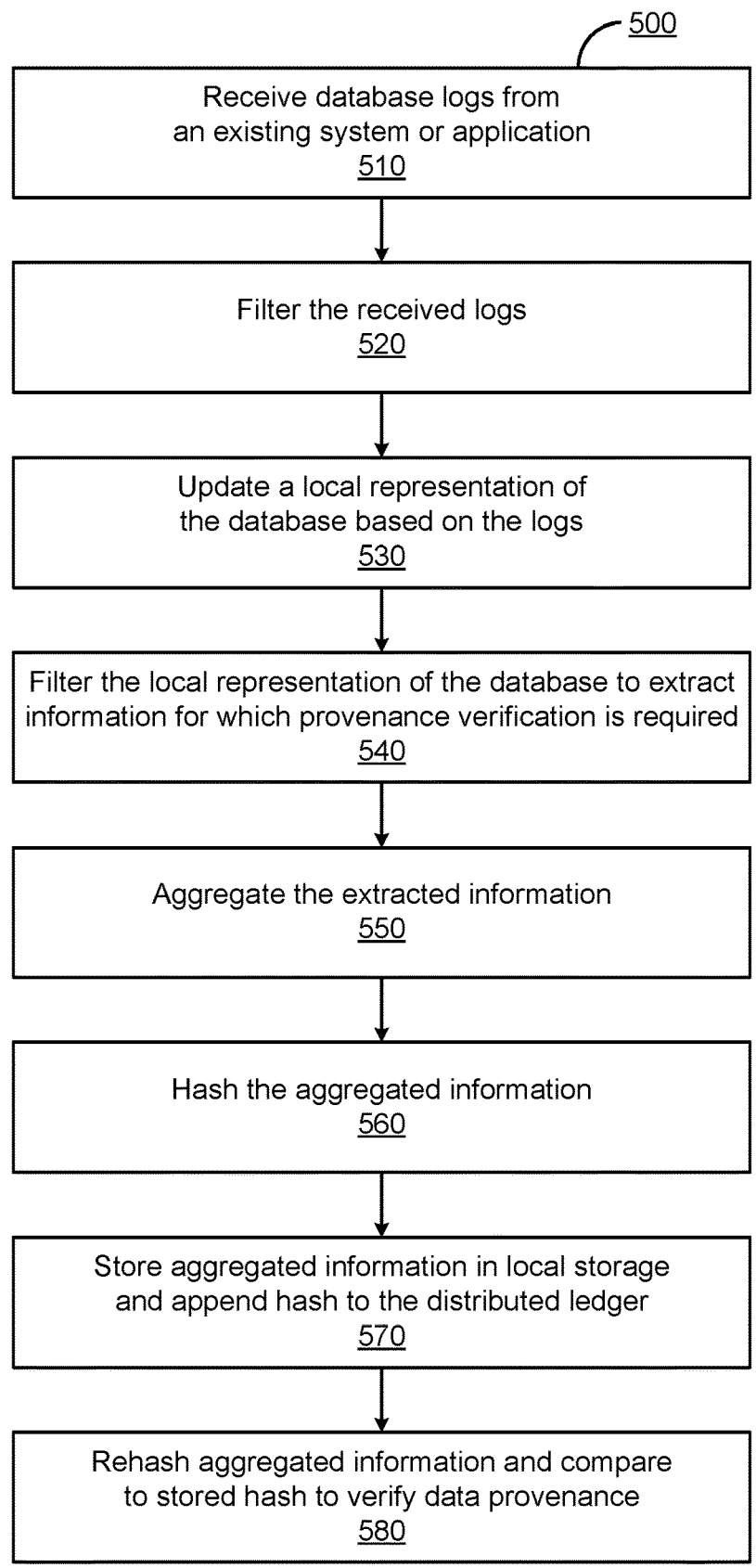
FIG. 5 illustrates a method for providing data provenance verification without substantially modifying existing systems, according to one embodiment.

FIG. 5 illustrates one embodiment of a method 500 for providing data provenance verification without substantially modifying existing systems. The steps of FIG. 5 are illustrated from the perspective of the proof of provenance system 120 performing the method 500. However, some or all of the steps may be performed by other entities and/or components. In addition, some embodiments may perform the steps in parallel, perform the steps in different orders, or perform different steps.

In the embodiment shown in FIG. 5, the method 500 begins with the proof of provenance system 120 receiving 510 logs from an existing system 110 or application 210. As described previously, the database logs may include a complete representation of a database (e.g., existing database 220) or just indicate changes, additions, and/or other modifications to the stored data.

In embodiments where a pre-filter is used, the proof of provenance system 120 filters 520 the received logs (e.g., to remove data objects for which provenance verification is not desired) and updates 530 a local representation of the database based on the logs. In one embodiment, the local representation is a complete replication of the existing database 220. In other embodiments, the local representation includes a subset of the data from the existing database 220.

In embodiments, where a post-filter is used, the proof of provenance system 120 filters 540 the local representation to extract information for which data provenance verification is required. For example, as described previously, the existing database 220 might include information about multiple products, and the database owner may only desire data provenance verification for certain products (e.g., those that are subject to regulation or are particularly valuable from a business perspective, etc.).

The proof of provenance system 120 aggregates 550 the extracted information to generate an aggregated slice. As described previously, in one embodiment, the aggregated slice is a flattened data representation of all of the data objects in the extracted information. The proof of provenance system 120 then hashes 560 the aggregated information to generate a hash value. In other embodiments, other approaches, such as calculating a checksum or digital fingerprint, are used to generate a reduced representation of the aggregated slice.

The proof of provenance system 120 stores 570 the aggregated slice (e.g., in local storage 380) and commits the hash to be appended to a distributed ledger or database. As noted previously, the distributed ledger may be a blockchain. In addition, the proof of provenance system 120 may use various methods to determine when to generate an aggregated slice and/or commit a new hash to the distributed ledger. For example, as described previously, the commitment of a hash to the distributed ledger might be part of a periodic process, triggered by specific events, or initiated using a combination of both approaches. Examples of specific events include certain types of updates to the existing database 220, budgetary events (e.g., a budget threshold being reached), an amount of data to be aggregated, and the like.

At a later time (e.g., when a user requests data provenance verification for a data object or objects), the proof of provenance system 120 rehashes 580 the corresponding aggregated information (e.g., an aggregated slice generated from data object or objects) and compares it to the hash that was appended to the distributed ledger. In one embodiment, the proof of provenance system 120 queries the distributed ledger for a hash matching the one generated by rehashing 580 the aggregated information. If a matching hash is found, the proof of provenance system 120 examines the timestamp of the hash from the distributed ledger. As it is impossible (or at least highly difficult) to modify data in the ledger after it has been appended, the proof of provenance 120 can guarantee that the data in question was present in the existing database 220 at least as of the time indicated by the timestamp with a high degree of certainty.

Additional Considerations

The systems, methods, and computer program products as disclosed provide benefits and advantages that include the ability to verify data provenance for existing systems without making substantial modifications to those systems. This may be valuable in various situations, such as where regulatory, budgetary, and/or technical constraints make modifying the existing system impractical or impossible. The disclosed data provenance verification techniques may provide particular value in heavily regulated industries. Where existing approaches require regulators (or other interested individuals) to trust each individual system that produces or stores data, the disclosed techniques may enable regulators to trust the data itself, as verified by comparison of the data with the hash or other representation stored in a distributed ledger or database.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 through 4. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 402, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for providing data provenance verification for an existing system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for enabling data provenance verification for an existing system, the method comprising:
    receiving, at a proof of provenance system, database logs generated by the existing system, the database logs indicating operations performed on a data set stored by the existing system;
    updating a local copy of the data set based on the operations performed on the data set indicated by the database logs, the local copy stored at the proof of provenance system;
    aggregating, responsive to a trigger event, information extracted from the local copy of the data set, the aggregating including flattening data objects within the extracted information to generate a hashable aggregated slice;
    applying a hash function to the aggregated slice to generate a first hash of the aggregated slice;
    storing, by the proof of provenance system, the aggregated slice in an aggregated slice store;
    adding the first hash to a buffer that includes one or more additional hashes;
    committing the first hash and the one or more additional hashes to be appended to a distributed ledger in a single transaction;
    adding, responsive to receiving confirmation that the single transaction was successful, metadata to the aggregated slice store indicating an order of the first hash and the one or more additional hashes in the distributed ledger;
    rehashing the aggregated slice at a later time to generate a second hash;
    querying the distributed ledger using the second hash to determine whether the second hash has been committed to the distributed ledger;
    responsive to determining the second hash has been committed to the distributed ledger, retrieving a timestamp from the distributed ledger, the timestamp indicating a time when the second hash was committed to the distributed ledger; and
    verifying the information was present in the data stored by the existing system at least as of the time indicated by the timestamp.

2. The method of claim 1, further comprising filtering the database logs to generate filtered logs, wherein the local copy of the data set is updated based on the filtered logs.

3. The method of claim 1, further comprising filtering the local copy of the data set to extract the information that is aggregated to generate the aggregated slice.

4. The method of claim 1, wherein the trigger event includes at least one of: determining a predefined amount of time has passed since generation of a previous aggregated slice, determining a predefined number of updates have been made to the data since generation of a previous aggregated slice, or detection of a specific event.

5. The method of claim 1, wherein the first hash is added to the buffer responsive to determining that the first hash was not successfully appended to the distributed ledger after committing, responsive to storing the aggregated slice, the first hash to be appended to the distributed ledger.

6. The method of claim 1, wherein the distributed ledger is a blockchain.

7. The method of claim 1, wherein the existing system does not natively provide data provenance verification and the method is performed without making any modification to the existing system.

8. A proof of provenance system comprising:
    a processor; and
    a computer-readable medium comprising stored instructions that, when executed, cause the processor to:
        receive, at a proof of provenance system, database logs generated by the existing system, the database logs indicating operations performed on a data set stored by the existing system;
        update a local-copy of the data set based on the operations performed on the data set indicated by the database logs, the local copy stored at the proof of provenance system;
        aggregate information extracted from the local copy of the data set, the instructions to aggregate information extracted from the local copy of the data set including instructions to flatten data objects within the extracted information to generate a hashable aggregated slice, wherein the instructions that cause the processor to aggregate information extracted from the local copy of the data set are configured to execute in response to the proof of provenance system detecting a trigger event;
        apply a hash function to the aggregated slice to generate a first hash of the aggregated slice;
        store, at the proof of provenance system, the aggregated slice in an aggregated slice store;
        commit the first hash of the aggregated slice to be appended to a distributed ledger;
        determine that the first hash was not successfully appended to the distributed ledger;
        add the first hash to a buffer that includes one or more additional hashes;
        commit the first hash and the one or more additional hashes to be appended to a distributed ledger in a single transaction;
        add, responsive to receiving confirmation that the single transaction was successful, metadata to the aggregated slice store indicating an order of the first hash and the one or more additional hashes in the distributed ledger;
        rehash the aggregated slice at a later time to generate a second hash;
        query the distributed ledger using the second hash to determine whether the second hash has been committed to the distributed ledger;
        responsive to determining the second hash has been committed to the distributed ledger, retrieve a timestamp from the distributed ledger, the timestamp indicating a time when the second hash was committed to the distributed ledger; and verify the information was present in the data stored by the existing system at least as of the time indicated by the timestamp.

9. The system of claim 8, wherein the stored instructions further comprise instructions that, when executed, cause the processor to filter the database logs to generate filtered logs, and wherein the instructions to update the local copy of the data set include instructions that, when executed, cause the processor to update the local representation based on the filtered logs.

10. The system of claim 8, wherein the stored instructions further comprise instructions that, when executed, cause the processor to filter the local copy of the data set to extract the information that is aggregated to generate the aggregated slice.

11. The system of claim 8, wherein the trigger event includes at least one of: determining a predefined amount of time has passed since generation of a previous aggregated slice, determining a predefined number of updates have been made to the data since generation of a previous aggregated slice, or detection of a specific event.

12. The system of claim 8, wherein the distributed ledger is a blockchain.

13. The system of claim 8, wherein the existing system does not natively provide data provenance verification and the steps are performed without making any modification to the existing system.

14. A non-transitory computer readable medium configured to store instructions, the instructions when executed by a processor causing the processor to:
receive, at a proof of provenance system, database logs generated by the existing system, the database logs indicating operations performed on a data set stored by the existing system;
update a local copy of the data set based on the operations performed on the data set indicated by the database logs, the local copy stored at the proof of provenance system;
aggregate information extracted from the local copy of the data set, the instructions to aggregate information extracted from the local copy of the data set including instructions to flatten data objects within the extracted information to generate a hashable aggregated slice, wherein the instructions that cause the processor to aggregate information extracted from the local copy of the data set are configured to execute in response to the proof of provenance system detecting a trigger event;
apply a hash function to the aggregated slice to generate a first hash of the aggregated slice;
store, at the proof of provenance system, the aggregated slice in an aggregated slice store;
add the first hash to a buffer that includes one or more additional hashes;
commit the first hash and the one or more additional hashes to be appended to a distributed ledger in a single transaction;
add, responsive to receiving confirmation that the single transaction was successful, metadata to the aggregated slice store indicating an order of the first hash and the one or more additional hashes in the distributed ledger;
rehash the aggregated slice at a later time to generate a second hash;
query the distributed ledger using the second hash to determine whether the second hash has been committed to the distributed ledger;
responsive to determining the second hash has been committed to the distributed ledger, retrieve a timestamp from the distributed ledger, the timestamp indicating a time when the second hash was committed to the distributed ledger; and
verify the information was present in the data stored by the existing system at least as of the time indicated by the timestamp.

15. The non-transitory computer readable medium of claim 14, wherein the stored instructions further comprise instructions that, when executed, cause the processor to filter the database logs to generate filtered logs, and wherein the instructions to update the local copy of the data set include instructions that, when executed, cause the processor to update the local representation based on the filtered logs.

16. The non-transitory computer readable medium of claim 14, wherein the stored instructions further comprise instructions that, when executed, cause the processor to filter the local copy of the data set to extract the information that is aggregated to generate the aggregated slice.

17. The non-transitory computer readable medium of claim 14, wherein the trigger event includes at least one of: determining a predefined amount of time has passed since generation of a previous aggregated slice, determining a predefined number of updates have been made to the data since generation of a previous aggregated slice, or detection of a specific event.

18. The non-transitory computer readable medium of claim 14, wherein the first hash is added to the buffer responsive to determining that the first hash was not successfully appended to the distributed ledger after committing, responsive to storing the aggregated slice, the first hash to be appended to the distributed ledger.

19. The non-transitory computer readable medium of claim 14, wherein the distributed ledger is a blockchain.

* * * * *